United States Patent
Long et al.

(10) Patent No.: US 11,093,563 B2
(45) Date of Patent: *Aug. 17, 2021

(54) SHARING MEASURED VALUES OF PHYSICAL SPACE PARAMETERS

(71) Applicant: Microsoft Technology Licensing, LLC, Redmond, WA (US)

(72) Inventors: Donna Katherine Long, Redmond, WA (US); Jennifer Jean Choi, Seattle, WA (US); Priya Ganadas, Seattle, WA (US); Jamie R. Cabaccang, Bellevue, WA (US); LaSean Tee Smith, Bellevue, WA (US); Kenneth Liam Kiemele, Redmond, WA (US); Evan L. Jones, Kirkland, WA (US); John Benjamin Hesketh, Kirkland, WA (US); Bryant Daniel Hawthorne, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 452 days.

This patent is subject to a terminal disclaimer.

(21) Appl. No.: 15/889,099

(22) Filed: Feb. 5, 2018

(65) Prior Publication Data

US 2019/0243921 A1    Aug. 8, 2019

(51) Int. Cl.
*G06F 16/00* (2019.01)
*G06F 16/9535* (2019.01)
(Continued)

(52) U.S. Cl.
CPC .......... *G06F 16/9535* (2019.01); *G06F 16/29* (2019.01); *G06Q 10/0639* (2013.01);
(Continued)

(58) Field of Classification Search
CPC ... G06F 16/9535; G06F 16/29; G06Q 20/127; G06Q 30/0631; G06Q 30/0205; G06Q 30/0201
See application file for complete search history.

(56) References Cited

U.S. PATENT DOCUMENTS 7,483,842 B1 * 1/2009 Fung ...................... G06Q 30/02
705/7.14
8,015,140 B2   9/2011 Kumar et al.
(Continued)

OTHER PUBLICATIONS

"International Search Report and Written Opinion Issued in PCT Application No. PCT/US2019/013888", dated Apr. 4, 2019, 13 Pages.

(Continued)

*Primary Examiner* — Jean M Corrielus
(74) *Attorney, Agent, or Firm* — Alleman Hall Creasman & Tuttle LLP (57) ABSTRACT

A computer system is provided that includes a server configured to store a plurality of location accounts, each location account being associated with a physical space at a recorded geospatial location. The plurality of location accounts utilize shared data definitions of a physical space parameter. Each physical space is equipped with a corresponding on-premise sensor configured to detect measured values for the physical space parameter over time and send to the server a data stream indicating the measured values. The computer system further includes a network portal, via which an authorized user for a location account can selectively choose whether to share the measured values or a summary thereof with other location accounts via the network portal.

20 Claims, 7 Drawing Sheets

(51) Int. Cl.

| | | |
|---|---|---|
| *G06Q 20/32* | (2012.01) | |
| *G06Q 30/02* | (2012.01) | |
| *G06Q 20/12* | (2012.01) | |
| *G06Q 10/06* | (2012.01) | |
| *G07F 17/24* | (2006.01) | |
| *G06Q 20/20* | (2012.01) | |
| *G06F 16/29* | (2019.01) | |
| *G06Q 30/06* | (2012.01) | |

(52) U.S. Cl.
CPC ......... *G06Q 20/127* (2013.01); *G06Q 20/202* (2013.01); *G06Q 20/3224* (2013.01); *G06Q 30/0201* (2013.01); *G06Q 30/0205* (2013.01); *G06Q 30/0631* (2013.01); *G07F 17/246* (2013.01)

(56) References Cited

U.S. PATENT DOCUMENTS

| | | | | |
|---|---|---|---|---|
| 8,551,991 | B2* | 10/2013 | Matsuda | A61P 27/06 |
| | | | | 514/234.8 |
| 9,027,024 | B2* | 5/2015 | Mick | G06F 9/44 |
| | | | | 718/1 |
| 10,210,567 | B2* | 2/2019 | Mick | G06F 9/45558 |
| 10,241,505 | B2* | 3/2019 | Cohen | G05B 23/0208 |
| 10,395,018 | B2* | 8/2019 | Turgeman | G06F 21/32 |
| 2002/0092019 | A1 | 7/2002 | Marcus | |
| 2007/0156531 | A1 | 7/2007 | Schuller et al. | |
| 2010/0049538 | A1 | 2/2010 | Frazer et al. | |
| 2012/0284105 | A1 | 11/2012 | Li | |
| 2013/0066750 | A1* | 3/2013 | Siddique | G06Q 10/0637 |
| | | | | 705/27.2 |
| 2013/0085804 | A1 | 4/2013 | Leff et al. | |
| 2014/0164084 | A1 | 6/2014 | Battles et al. | |
| 2014/0195664 | A1* | 7/2014 | Rahnama | H04W 4/70 |
| | | | | 709/223 |
| 2015/0127438 | A1* | 5/2015 | Wedderburn | G06Q 30/0214 |
| | | | | 705/14.16 |
| 2015/0206081 | A1 | 7/2015 | Lee et al. | |
| 2015/0269599 | A1 | 9/2015 | Lee | |
| 2016/0104175 | A1* | 4/2016 | Fanourgiakis | G06Q 10/0637 |
| | | | | 705/7.29 |
| 2016/0104176 | A1* | 4/2016 | Kama | G06Q 30/0202 |
| | | | | 705/7.31 |
| 2016/0321696 | A1 | 11/2016 | Murthy | |
| 2016/0321699 | A1* | 11/2016 | Shahraray | G11B 27/005 |
| 2017/0132553 | A1* | 5/2017 | Theirl | G06Q 10/06393 |
| 2017/0286980 | A1 | 10/2017 | Winters et al. | |
| 2019/0008072 | A1* | 1/2019 | Morgan | G06Q 10/06 |
| 2019/0213616 | A1* | 7/2019 | Eppley | G06Q 20/3224 |

OTHER PUBLICATIONS

"Non Final Office Action Issued in U.S. Appl. No. 16/020,869", dated Jun. 11, 2020, 16 Pages.

"International Search Report and Written Opinion Issued in PCT Application No. PCT/US2019/037572", dated Aug. 13, 2019, 11 Pages.

* cited by examiner

SHARING MEASURED VALUES OF PHYSICAL SPACE PARAMETERS

BACKGROUND

Economical sensors have been developed that can measure and record various types of data in a physical environment, and upload that data to computer devices that can integrate data from a multitude of such sensors. The collection of data gathered from the multitude of sensors can be used to gain insights and knowledge about trends within that physical environment. However, this measured data takes time to gather, and is typically siloed within the organization that is collecting the data, even though the data is potentially valuable to other organizations.

SUMMARY

A computer system is provided that may include a server configured to store a plurality of location accounts, each location account being associated with a physical space at a recorded geospatial location. The plurality of location accounts may utilize shared data definitions of a physical space parameter. Each physical space may be equipped with a corresponding on-premise sensor configured to detect measured values for the physical space parameter over time and send to the server a data stream indicating the measured values. The computer system may further comprise a network portal, via which an authorized user for a location account can selectively choose whether to share the measured values or a summary thereof with other location accounts via the network portal. The server may be further configured to determine a recommendation for a first location account based at least on measured values of the physical space parameter shared by a second location account, and present the recommendation to a user of the first location account via the network portal.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Economical sensors have been developed that can measure and record various types of data in a physical environment, such as customer demographic data, point of service data, temperature data, and other types of data that may be leveraged to gain valuable insights about that physical environment. Proprietors of the physical space/environment can use the gathered data to take suitable actions, such as adding or removing products and services, modifying the physical space's layout, changing music and lighting in the physical space to alter a mood of the physical space, etc. However, this measured data takes time to gather, and is typically siloed within the organization that is collecting the data. As a result, these organizations potentially may spend unnecessary money, time, and energy collecting data that may have already been gathered by another organization. Further, these organizations may only be able to leverage their own data, and miss potential insights and knowledge about their physical environment that could have been gained from data collected by other organizations. While current social networks exist for individuals to interact with each other and exchange messages, photos and videos, and status updates, these social networks do not allow entities to share data collected by instruments in a physical space and organized in a structured manner enforced by the network. As a result, the opportunity to collaborate and leverage of data collected at other physical spaces is limited.

Figure 1:
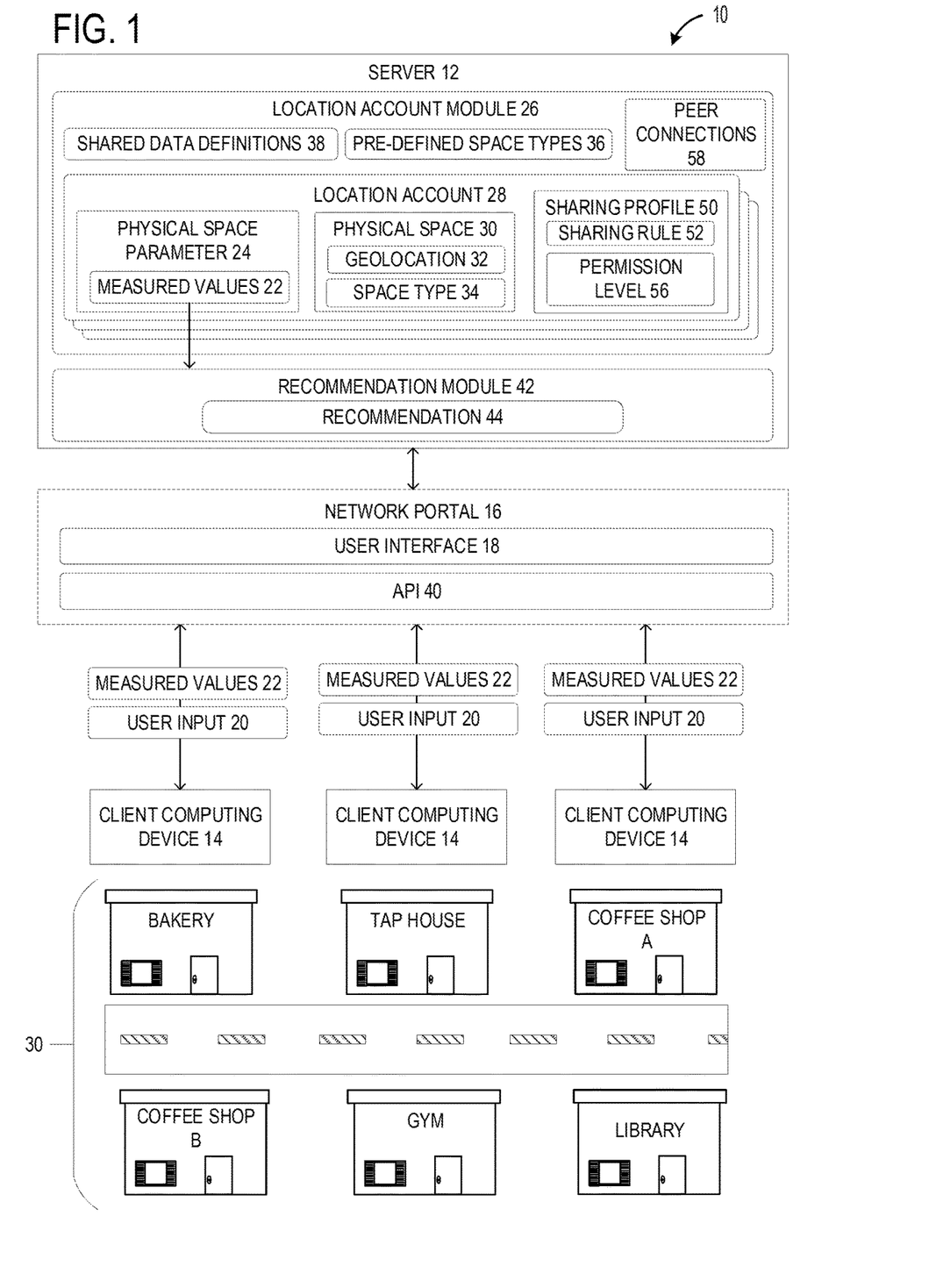
FIG. 1 is a schematic view of a computer system including a server, a network portal, and a plurality of client computing devices according to one implementation of the present disclosure.

To address these issues, a computer system 10 is provided. FIG. 1 illustrates a schematic view of the computer system 10 for sharing measured data among a plurality of different physical spaces, which, for example, may include businesses or other entities located in buildings such as restaurants, stores, offices, etc. In other examples, the physical spaces may include locations that are not located in a building, such as a farm, an athletic track, an outside area, etc. It will further be appreciated that other types of physical spaces and locations not specifically enumerated herein may utilize the computer system 10 to share measured data.

As shown, the computer system 10 includes a server 12 and a plurality of client computing devices 14 that communicate with the server 12 via a network portal 16. In one example, the network portal 16 is implemented by the server 12. In another example, the network portal 16 is implemented by a separate computing device configured to communicate with the server 12 and is accessible by the plurality of client computing devices 14. The network portal 16 includes a user interface 18 that is presented to users via a browser or client-side application executed on the client computing device 14. Each user may enter user input 20 to the user interface 18 of the network portal 16 via input devices of their respective client computing devices 14, such as, for example, a keyboard and mouse. Each user, which, for example, may be authorized users for each physical space, such as the illustrated Bakery, Taphouse, Coffee Shop A, Coffee Shop B, Gym, or Library, may select a subset of measured values 22 of physical space parameters 24 to upload to the server 12 for sharing with other users.

In one example, the server 12 may take the form of a single server computing device configured to perform the processes and methods described herein. In this example, the server 12 may include a processor, non-volatile storage, volatile storage, and other suitable computing components.

In another example, the server 12 may include a plurality of server computing devices configured to work in a cloud computing configuration to implement the processes and methods described herein. The server 12 is configured to communicate with the plurality of client computing devices 14 via the network portal 16.

Each of the client computing devices 14 may also include a processor, non-volatile storage, volatile storage, and other suitable computing components, such as an input device and display. Each client computing device 14 is configured to, via a browser or client-side application, interact with the user interface 18 of the network portal 16 to select a subset of measured values 22 of one or more physical space parameters 24 measured by on-premise sensors of a physical space, and send those measured values 22 to the server 12 via the network portal 16 for sharing with other users. In one example, the client computing device 14 may take the form of a desktop computing device. However, it will be appreciated that the client computing device 14 may take other forms, such as, for example, a laptop, a tablet computing device, a mobile computing device, or a computing device integrated into a point of sale system.

The measured values 22 of the one or more physical space parameters 24 sent by each client computing device 14 are received by and stored on the server 12. As illustrated, the server 12 includes a location account module 26 configured to store a plurality of location accounts 28. Each location account 28 is associated with a physical space 30 at a recorded geospatial location 32. In the illustrated example, the physical spaces 30 may include the illustrated Bakery, Tap House, Coffee Shop A, Coffee Shop B, Gym, and Library. Each physical space 30 has a recorded geospatial location 32, which is where the building of the physical space 30 is located. In one example, the recorded geospatial location 30 may be a street address. In another example, the recorded geospatial location 30 may be a GPS location. In yet another example, the recorded geospatial location 30 may be a map location on a two or three-dimensional map of an area. Additionally, it will be appreciated that the example physical spaces 30 illustrated in FIG. 1 are merely exemplary, and that the physical space 30 may take other suitable forms, such as, for example, non-covered physical spaces such as a track and field, a farm, a golf course, etc., as discussed above.

Each location account 28 may also include a space type 34 associated with the physical space 30 selected from a plurality of pre-defined space types 36. The plurality of pre-defined space types 36 define what type of physical space 30 is associated with that location account 28. In the illustrated example, the plurality of pre-defined space types 36 may include a Bakery space type, a Tap House space type, a Coffee Shop space type, a Gym space type, and a Library space type. However, it will be appreciated that the plurality of pre-defined space types 36 may include other space types not shown in the illustrated example, such as a Farm space type, a Golf Course space type, a Track and Field space type, or any other suitable space type. An authorized user for a location account 28 may select an appropriate space type 34 to be associated with their location account 28 via the user interface 18 of the network portal 16. It will be appreciated that multiple location accounts 28 may each be associated with the same space type from the plurality of pre-defined space types 36. In the illustrated example, a location account 28 for the Coffee Shop A physical space may have the same Coffee Shop space type as a location account 28 for the Coffee Shop B physical space.

In addition to utilizing a shared set of predefined space types 36, the plurality of location accounts 28 may utilize shared data definitions 38 of one or more physical space parameters 24. In one example, the one or more physical space parameters 24 may include temperature, lighting, music, density of persons, customer demographics, point of sale data, store hours, day of year, time of day, product types, display types, and store layout. As other examples, the physical space parameters may include atmospheric gas composition, wavelengths of ambient light, vibration, customer interactions with objects in the store, employee's interactions with customers in the physical store. However, it will be appreciated that the one or more physical space parameters 24 may include other types of physical space parameters not listed above. For each type of physical space parameter 24, the server 12 may include a shared data definition 38 for measured values of that physical space parameter. For example, a temperature physical space parameter may have a shared data definition 38 of Celsius or Fahrenheit. As a few other non-limiting examples, a lighting physical space parameter may have a light intensity shared data definition. A music physical space parameter may have a music title or music genre shared data definition. A density of persons physical space parameter may have a number of persons per area shared data definition. A customer demographics physical space parameter may have an anonymized demographic shared data definition, such as, for example, age, race, purchasing habits, etc. A point of sale data physical space parameter may have currency shared data definitions, such as dollars. A store hours physical space parameter may have a time of day range shared data definition for each day of the year. A product type physical space parameter may have a shared data definition for each type of sellable product or service. A display type physical space parameter may have shared data definitions for how products may be displayed in a store, such as via a shelf, in a display case, etc. A store layout physical space parameter may have shared data definitions for non-product objects that may be placed in physical spaces, such as furniture, decorations, etc. It will be appreciated that the physical space parameters 24 and the shared data definitions 38 for each physical space parameter 24 are not limited to the examples described above.

In one example, the measured values 22 of the physical space parameters 24 sent by each client computing device 14 must comply with the shared data definitions 38 to be uploaded to the server 12. In one example, the network portal 16 may include an API 40 that provides functionality for each of the client computing devices 14 to upload their measured values 22. The API 40 may perform data type checking on the measured values 22 to verify that each measured value 22 uploaded by the client computing device 14 conforms to the shared data definitions 38 set by the server 12. Thus, the measured values 22 of the one or more physical space parameters 24 stored on the server 12 for each location account 28 all conform to the shared data definitions 38 defined by the server 26 and enforced by the API 40 of the network portal 16. In this manner, the measured values from a first location account 28 may be programmatically compared to the measured values of a second location account 28.

As illustrated in FIG. 1, the server 12 further includes a recommendation module 42 configured to compare measured values 22 of physical space parameters 24 among the plurality of location accounts 28 stored on the server 12, and determine recommendations for one or more location accounts 28 based on the comparisons. In one example, the recommendation module 42 implemented by the server 12 is configured to determine a recommendation 44 for a first location account of the plurality of location accounts 28 based at least on measured values 22 of the physical space parameter 24 shared by a second location account of the plurality of location accounts 28. The recommendation module 42 may be configured to compare measured values 22 for multiple different physical space parameters 24 between two or more location accounts 28 to determine the recommendation 44. As one specific example, the recommendation module 42 may be configured to compare measured values for the Point of Sale physical parameter between location accounts 28 having the same space type 34, and provide a recommendation to a first location account with a lower number of sales based on compared differences between other measured values 22 of other physical space parameters 24 between that location account and a second location account with a higher number of sales. After determining the recommendation 44, the server 12 may be configured to present the recommendation 44 to a user of the first location account via the network portal 16. For example, the recommendation 44 may be shown to the user via the user interface 18 of the network portal 16 displayed on the user's client computing device 14.

To measure and track the one or more physical space parameters 24, each physical space 30 may be equipped with a corresponding on-premise sensor 46 configured to detect measured values 22 for the physical space parameter 24 over time. Each on-premise sensor 46 may be configured to measure one or more of the physical space parameters 24. In one example, one or more of the on-premise sensors may be configured for wireless capability, and may individually send, to the server 12, a data stream indicating the measured values 22. In another example, each on-premise sensor 46 may be configured to communicate with an associated client computing device 14 for that physical space 30. In this example, the associated client computing device 14 may be configured to gather the measured values 22 of one or more physical space parameters 24 from each on-premise sensor 46, and send a data stream indicating the measured values 22 to the server 12. In one example, the measured values 22 for a physical space parameter 24 may be measured by a user and entered via an input device of the client computing device. For example, a user may enter data for a Store Layout physical space parameter to the client computing device 14. The on-premise sensors 46 may include a temperature sensor configured to sense temperature, a light sensor configured to sense ambient light intensity and/or wavelength, a microphone configured to sense sound and coupled to logic circuitry configured to identify patterns of music, depth cameras and RGB cameras configured to detect density of persons and customer demographics, point of sale sensors configured to detect point of sale data, clocks configured to detect store hours, day of year, and time of day, scanners configured to scan product codes and detect product types, depth cameras and RGB cameras configured to recognize display types and store layout. As other examples, the sensors may include gas detectors configured to detect atmospheric gas composition, vibration sensors configured to detect vibrations, depth cameras and RGB cameras and microphones configured to detect customer interactions with objects in the physical space and also configured to detect employee interactions with customers in the physical space.

Figure 2:
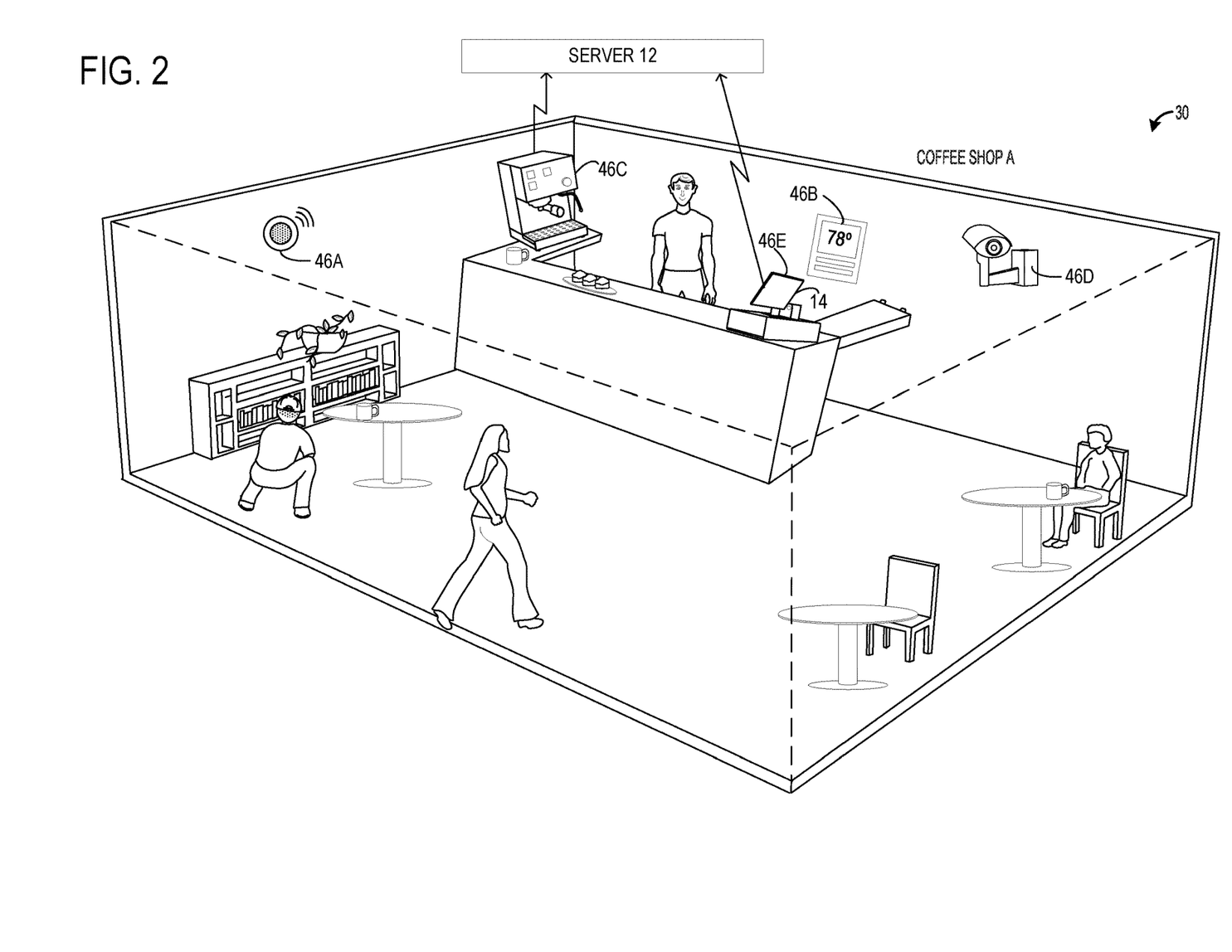
FIG. 2 shows an example physical space including on-premise sensors configured to send measured values to the server of FIG. 1.

FIG. 2 illustrates an example physical space 30 for the Coffee Shop A illustrated in FIG. 1 having the Coffee Shop space type selected from the plurality of pre-defined space types 36. The example physical space 30 includes a plurality of on-premise sensors 46. In the illustrated example, the plurality of on-premise sensors 46 includes a music on-premise sensor 46A that is integrated into the speaker or a computer device that is streaming music to the speaker, a temperature on-premise sensor 46B that is integrated into the temperature control, an espresso flow rate on-premise sensor 46C that is integrated into the espresso machine, a camera on-premise sensor 46D that is integrated in the video camera device, and a point of service on-premise sensor 46E that is integrated in a point of service computing device. It will be appreciated that the illustrated on-premise sensors 46A-46E are merely exemplary, and that other types of on-premise sensors 46 may be used measure other types of physical space parameters 24.

In the illustrated example, the espresso flow rate on-premise sensor 46C is configured for wireless connectivity, and is itself configured to wirelessly stream its measured values 22 of an espresso flowrate physical space parameter 24 to the server 12 via a wireless network of the example physical space 30 (Coffee Shop A). In another example, the espresso flow rate on-premise sensor 46C may instead be configured to stream the measured values 22 to the client computing device 14, which, in this specific example, may be integrated in the point of sale computing device. The client computing device 14 may similarly receive steams of data of measured values 22 from each other on-premise sensor, including the music on-premise sensor 46A, the temperature on-premise sensor 46B, the camera on-premise sensor 46D, and the point of service on-premise sensor 46E. An authorized user of a location account 28 associated with the Coffee Shop A physical space may also enter measured values 22 for other physical space parameters 24, such as selecting a store layout physical space parameter. In the illustrated example, the authorized user may indicate that the store layout includes a bookcase having a plurality of books. In another example, the store layout physical parameter may be measured via the camera on-premise sensor 46D using image analysis techniques and methods.

The client computing device 14 may be configured to gather all of these streams of measured values 22 from each on-premise sensor 46, and upload the measured values 22 to the server 12 via the network portal 16. In one example, the client computing device 14 may execute a client application program, such as a browser, configured to utilize the functionality of the API 40 of the network portal 16 to appropriately stream the measured values gathered by the client computing device 14 to the server 12. The streaming of the measured values may be a continuous transmission of values in real-time or near real-time, or may be a periodic or occasional transmission of a batch of measured values.

In one example, the measured values 22 of the one or more physical space parameters 24 may be selectively shared by the client computing device 14 to the server 12. For example, the user of the Coffee Shop A physical space 30 may not want to share precise Point of Sale data, or may not want to share their data with the rival Coffee Shop B physical space across the street, and may select sharing permissions for each of a data type and resolution of data, as appropriate. In this way, a user may set sharing permissions for space, for example, to share density of customers data but not sales receipts data, with the density of customers data being shared at 0-25, 25-50, and more than 50 person resolution, as one example.

Figure 3:
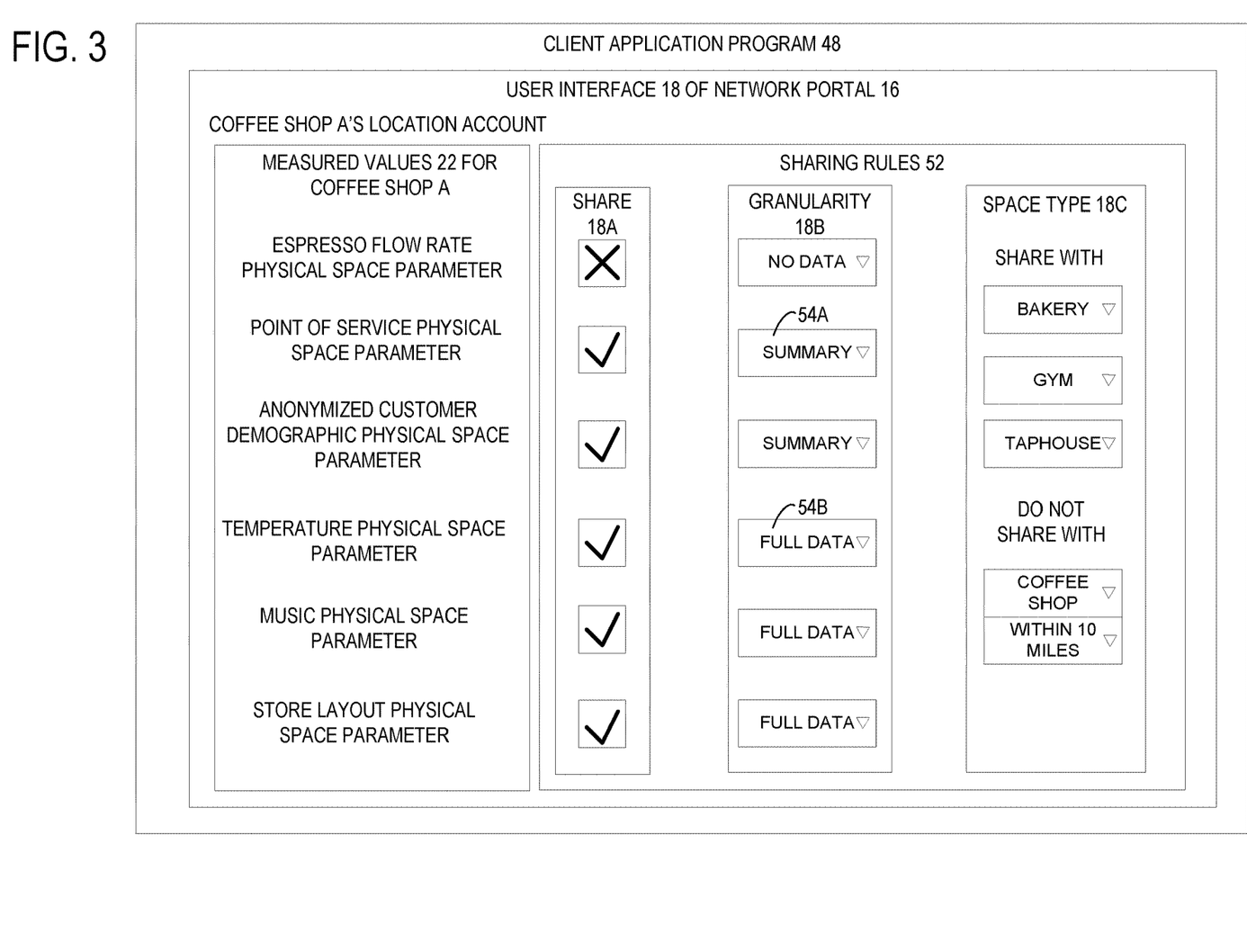
FIG. 3 shows an example user interface of the network portal of FIG. 1.

FIG. 3 illustrates an example network portal 12 accessed by a client application program 48 executed on a client computing device 14, via which an authorized user for a location account 28 can selectively choose whether to share the measured values 22 or a summary thereof with other location accounts 28 via the network portal 12. For example, an authorized user for the Coffee Shop A physical space may want to selectively share the measured values 22 from the on-premise sensors 46 with only physical spaces 30 that are not rival Coffee Shops. In another example, the authorized user may want to share the measured values 22 with the rival Coffee Shop B only if they reciprocate. In these examples, the authorized user may select appropriate sharing settings via the user interface 18 of the network portal 16 via user input 20 entered to an input device of the client computing device 14.

As shown in FIG. 1, each location account 28 has an associated sharing profile 50 set by the authorized user for that location account 28, the sharing profile 50 defining a sharing rule 52 according to which the measured values 22 of the physical space parameter 24 are shared via the network portal 16 with other location accounts 28. In one example, settings for the sharing rule may be adjusted by the authorized user for the location account 28 via the user interface 18 of the network portal 16. FIG. 3 illustrates an example user interface 18 of the network portal 16 which includes various GUI elements configured to receive the user input 20 from the plurality of client computing devices 14. Using the GUI elements of the example user interface 18, the authorized user for a location account 28 may selectively adjust the sharing rules 52 for the measured data 22 gathered by the on-premise sensors 46 of the physical location 30 for that location account 28.

In the example illustrated in FIG. 3, the sharing rule 52 includes one or more physical space parameters selected from a plurality of physical space parameters 24 that are shared via the network portal 16 with other location accounts 28, and one or more physical space parameters selected from the plurality of physical space parameters 24 that are not shared. In the illustrated example, each category of measured values 22 gathered by the suite of on-premise sensors 46 of the Coffee Shop A physical space are shown. Using the share GUI element 18A of the user interface 18, the authorized user of the location account 28 associated with the Coffee Shop A physical space 30 may select one or more physical space parameters that may be shared via the network portal 16 and one or more physical space parameters that may not be shared. In the illustrated example, the authorized user has selected that measured values 22 for the Point of Service physical space parameter, the anonymized customer demographic data physical space parameter, the temperature physical space parameter, the music physical space parameter, and the store layout physical space parameter maybe shared with other location accounts 28 via the network portal 16. On the other hand, the authorized user has also selected that measured values 22 for the espresso flow rate physical space parameter are not to be shared with out location accounts 28. In this manner, the authorized user may enter user input 20 to the user interface 18 to selectively share measured values 22.

As further illustrated in FIG. 3, the authorized user may also set other types of sharing rules 52 that further define how the measured values 22 gathered by the corresponding on-premise sensors 46 may be shared with out location accounts 28. In one example, the sharing rules 52 include a sharing granularity 54 at which the measured values 22 of the physical space parameter 24 are shared via the network portal 16 with other location accounts 28. In the illustrated example, the authorized user may enter user input 20 to a sharing granularity GUI element 18B which may include a drop down menu for each measured physical space parameter 30. Using the sharing granularity GUI element 18B, the authorized user may select a sharing granularity 54 at which the measured values 22 for each measured physical space parameter 30 may be shared. In this example, the user may select between a summary sharing granularity 54A and a full data sharing granularity 54B. The summary sharing granularity 54A may include sharing an average or range of measured values for the corresponding physical space parameter 24. On the other hand, the full data sharing granularity 54B may include sharing the full set of measured values 22 for the corresponding physical space parameter 24. While only two sharing granularity options are illustrated, it will be appreciated that any other suitable granularity may be utilized, such as, for example, a course vs fine granularity.

In another example, the sharing rule 52 may further includes selecting one or more of the plurality of pre-defined space types 36 such that the measured values 22 of the physical space parameter 24 are not shared with location accounts 28 associated with the one or more of the plurality of pre-defined space types selected by the authorized user. In the illustrated example of FIG. 3, the authorized user may enter user input 20 to the space type GUI element 18C which may include one or more dropdown menus where the user may whitelist or blacklist certain physical space types for sharing. In the illustrated example, the authorized user for the Coffee Shop A has explicitly whitelisted the Bakery space type, the Gym space type, and the Taphouse space type for data sharing. On the other hand, the authorized user has explicitly blacklisted the Coffee Shop space type such that the measured values 22 of the physical space parameters 24 gathered by the on-premise sensors 46 of the Coffee Shop A physical space are not shared with any other location accounts 28 associated with the Coffee Shop space type. Thus, in the example of FIG. 1, Coffee Shop A's measured values will be shared via the network portal 16 with the nearby Bakery, Taphouse, and Gym, and may potentially be shared with the local library as well. On the other hand, Coffee Shop A's measured values will not be shared with Coffee Shop B.

It will be appreciated that the sharing rules 52 may include other types of rules. For example, the sharing rules 52 may further include a distance threshold for which the measured values 22 will be or not be shared. In the example illustrated in FIG. 3, the authorized user has selected that the measured values 22 will specifically not be shared with location accounts 28 that are both associated with the Coffee Shop space type and that are within ten miles. Thus, the measured values 22 may potentially be shared with location accounts 28 associated with the Coffee Shop space type that are farther than ten miles away, and are thus less likely to be competing stores.

It will be appreciated that the illustrated user interface 18 and the various GUI elements described above are merely exemplary, and that other configurations and GUI elements may be utilized to receive user input and perform the functionality described above.

Turning back to FIG. 1, the server 12 may be further configured to manage a permission level 56 for each location account 28, and selectively grant access to measured values 22 of the physical space parameter 24 shared by other location accounts based on the permission level 56 of that location account 28. In one example, the server 12 may be configured to share a finer granularity of measured values 22 the higher the permission level 56 granted to a location account 28. As another example, the server 12 may be configured to only share measured values 22 of physical space parameters 24 for which that location account is also sharing, in a reciprocal manner. As a specific example, the server 12 may be configured to only share the Point of Sale measured values of other physical spaces 30 to the authorized user of the Coffee Shop A physical space, if that authorized user also configures the sharing rules 52 for the location account 28 associated with the Coffee Shop A physical space to also share its Point of Sale measured values 22.

In another example, the server 12 may be configured to promote and demote the permission level 56 of a location account 28 based on the measured values 22 of the physical space parameter 24 shared by that location account 28. That is, by sharing a greater variety and finer granularity of measured values 22 on the network, an authorized user of a location account 28 may be similarly granted access to a greater variety and finer granularity of measures values 22 from other location accounts. However, it will be appreciated that the permission level 56 of a location account 28 may be selectively promoted and demoted based on other metrics, such as, for example, a pay to access model of permission.

Figure 4:
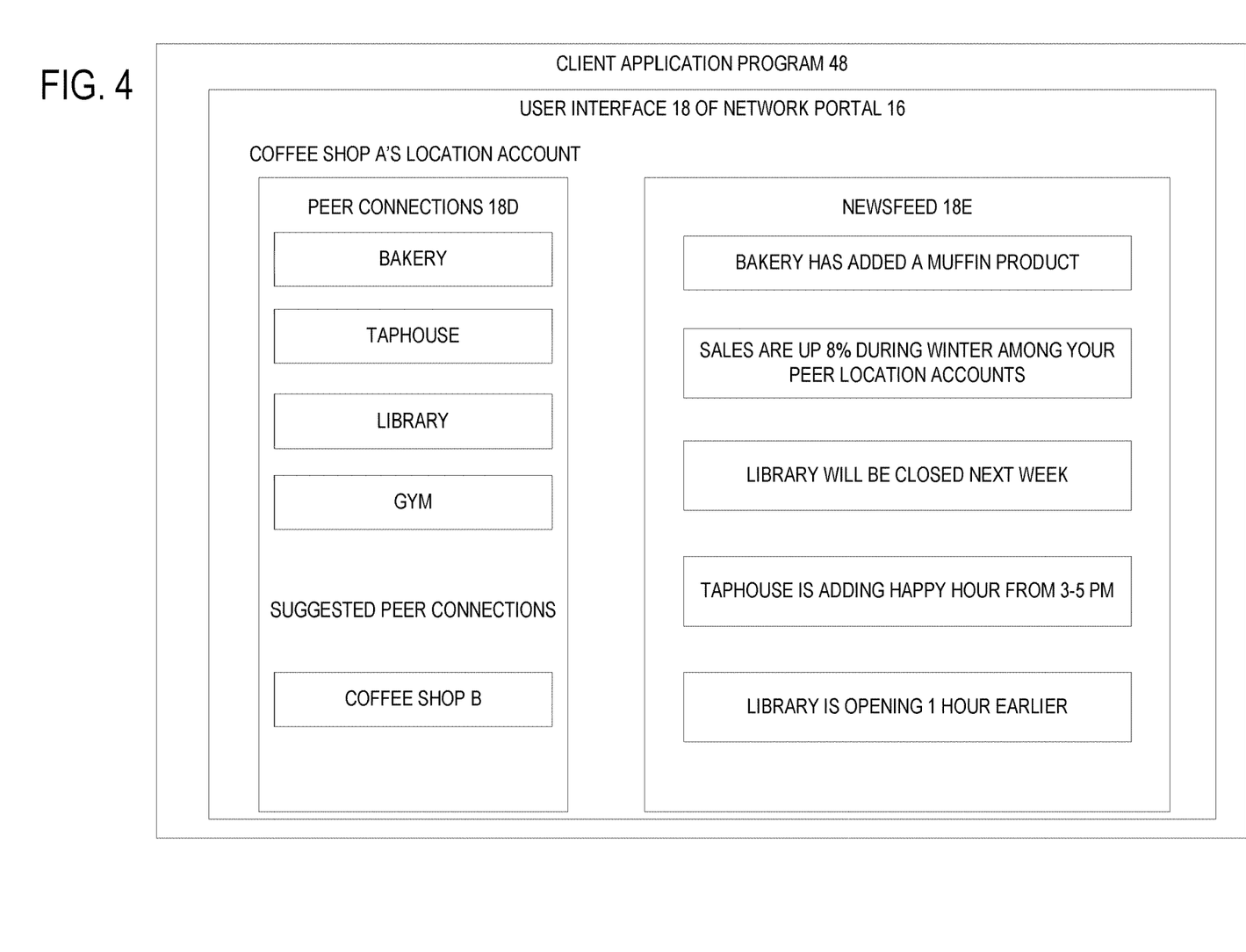
FIG. 4 shows another example user interface of the network portal of FIG. 1.

In the example illustrated in FIG. 4, each location account 28 is linkable to other location accounts 28 via peer connections 58 in the network portal 16. The peer connections 58 may be stored on the server 12 in a suitable data structure. The authorized user for a location account 28 may view their peer connections 58 via the user interface 18 of the network portal 16. In the example illustrated in FIG. 4, the authorized user for the Coffee Shop physical space currently has peer connections with the Bakery physical space, the Tap House physical space, the Library physical space, and the Gym physical space, and is presented with a list of these peer connections 58 via a peer GUI element 18D of the user interface 18 of the network portal 16. In one example, the authorized user may enter user input 20 to the user interface 18 to search for other physical spaces to potentially form a peer connection.

In another example, the server 12 may be configured to programmatically determine one or more other location accounts 28 as candidates for a peer connection 58. For example, the server 12 may be configured to determine a similarity between a first physical space associated with a first location account and a second physical space associated with a second location account, and suggest establishment of a peer connection 58 to the first and second location accounts. In one example, the server 12 may be configured to determine the similarity between the first and second physical spaces based on a geospatial proximity. That is, if the first and second physical spaces are within a threshold geospatial distance of each other, the server 12 may be configured to suggest establishment of a peer connection between the first and second location accounts associated with the first and second physical spaces.

As another example, the server 12 may be configured to determine the similarity between the first and second physical spaces based on a similar space type. In the example illustrated in FIG. 4, the server 12 has suggested a peer connection between a location account associated with the Coffee Shop A physical space and a location account associated with the Coffee Shop B physical space based on determining that the two location accounts had the same Coffee Shop space type from the plurality of pre-defined space types 36. However, it will be appreciated that the server 12 may determine the similarity based on different space types that may have a relationship. For example, while the Library space type is different than the Coffee Shop space type, the server 12 may determine that there is a trend between the customer demographics of location accounts having the Coffee Shop space type and location accounts having the Library space type. Thus, the server 12 may be configured to suggest peer connections between locations accounts having the Coffee Shop space type and location accounts having the Library space types.

It will be appreciated that the above examples of similarities between locations accounts are merely exemplary, and that the server 12 may determine a similarity between location accounts based on other metrics, such as determining a similarity in measured values 22 of the physical space parameters.

As illustrated in FIG. 4, the user interface 18 of the network portal 16 may be configured to present a newsfeed GUI element 18E to the authorized user of the location account 28 based on the location account's peer connections 18D. In this example, the server 12 may be configured to determine relevant information for the authorized user of the location account 28 based on measured values 22 shared by that location account's peer connections 58. For example, the server 12 may be configured to provide news about changes in measured values for the Hours of Operation physical space parameter shared by the peer location accounts. As another example, the server 12 may be configured to provide news about changes in measured values for the Point of Sale physical space parameter shared by the peer location accounts. It will be appreciated that the above examples of news information determined by the server 12 are merely exemplary, and that the server 12 may be configured to provide any other type of news to a location account based on the measured values 22 shared by that location account's peer connections.

In another example, the server 12 may be configured to promote a location account's permission level 56 for specifically measured values 22 shared by peer connections. That is, while a location account 28 may have a low permission level 56 and is usually only provided with course granularity of measured values 22, the server 12 may be configured to provide that location account with a higher granularity for measured values 22 shared by that location account's peer connections.

Figure 5:
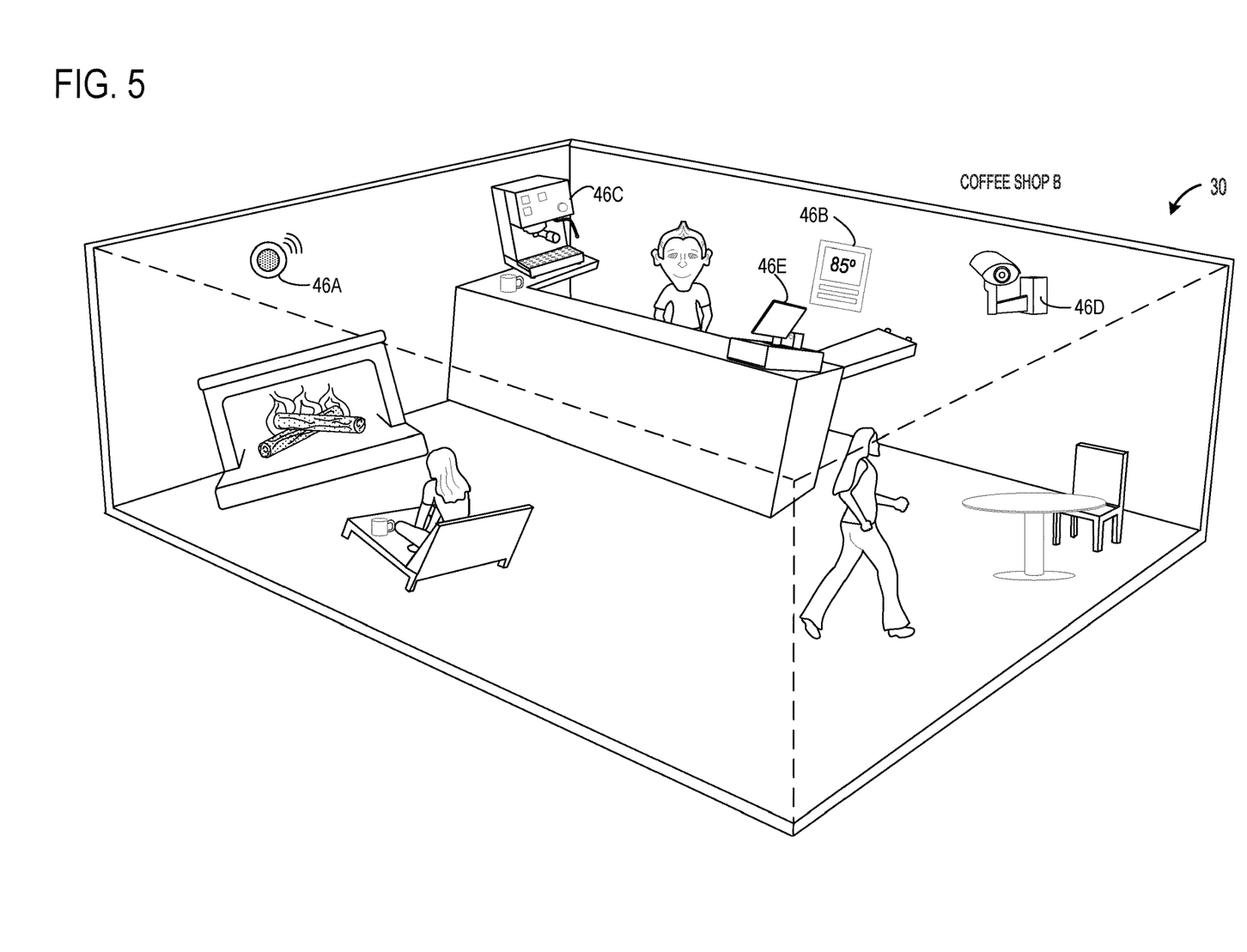
FIG. 5 shows another example physical space including on-premise sensors configured to send measured values to the server of FIG. 1.

As described previously, the recommendation module 42 implemented by the server 12 may be configured to compare measured values 22 of physical space parameters 24 among the plurality of location accounts 28 stored on the server 12, and determine recommendations for one or more location accounts 28 based on the comparisons. FIG. 5 illustrates a second example physical space 30 for the Coffee Shop B physical space that is a different coffee shop than the Coffee Shop A physical space. As shown, the Coffee Shop B physical space has a similar plurality of on-premise sensors 46 including a music on-premise sensor 46A that is integrated into the speaker or a computer device that is streaming music to the speaker, a temperature on-premise sensor 46B that is integrated into the temperature control, an espresso flow rate on-premise sensor 46C that is integrated into the espresso machine, a camera on-premise sensor 46D that is integrated in the video camera device, and a point of service on-premise sensor 46E that is integrated in a point of service computing device. In this example, the authorized user of the location account 28 for the Coffee Shop B physical space has set the sharing rules 52 to share all of the measured data 22 collected by the on-premise sensors with the location account 28 for the Coffee Shop A physical space. In this example, the authorized user for the location account 28 for the Coffee Shop A has similarly reciprocated.

Thus, the server 12 may be configured to compare the measured values 22 for one or more physical space parameters 24 between the Coffee Shop A physical space and the Coffee Shop B physical sp ace.

In the illustrated example, the measured values 22 for the temperature physical space parameter as measured by the temperature on-premise sensor 46B of the Coffee Shop B physical space indicate an average temperature of 85 degrees Fahrenheit. Additionally, measured values 22 for the Store Layout physical space parameter as entered by the authorized user indicates that a fireplace is installed in the Coffee Shop B. Lastly, the server 12 has determined, based on measured values 22 for the Point of Sale physical space parameter of Coffee Shop A and Coffee Shop B, that the Coffee Shop B tends to sell more coffee than Coffee Shop A during the winter. In this example, the server 12 may compare the measured values 22 of the Coffee Shop A physical space and the Coffee Shop B physical space, and determine that the Coffee Shop B has a higher average temperature during the winter as well as a fireplace in the store layout where the Coffee Shop A has a bookcase. Thus, the server 12 may be configured to determine a recommendation for the location account associated with the Coffee Shop A based on these differences, which may include recommending that the Coffee Shop A increase the stores temperature during the winter and install a fireplace. It will be appreciated that the above scenario is merely exemplary, and that the server 12 may be configured to determine the recommendation 44 based on comparing any suitable sets of measured values 22 of physical space parameters.

After the authorized user has implemented the recommendation 44 presented to the authorized user via the user interface 18 of the network portal 16, the server 12 may track the measured values 22 of the one or more physical space parameters 24 uploaded by the authorized user subsequently to implementing the recommendation 44. In one example, the recommendation module 42 may be configured to compare the measured values 22 collected subsequently to implementing the recommendation 44 to measured values collected previously to implementing the recommendation 44 to determine how the recommendation 44 has affected one or more physical space parameters 24. In one specific example, the recommendation module 44 may be configured to compare measured values for the Point of Service physical space parameter before and after implementation of the recommendation 44 to determine how the recommendation 44 has affected sales. In another example, the recommendation module 44 may be configured to compare measured values 22 for density of persons and/or customer demographics to determine how the recommendation 44 has affected the customers of the physical space 30. In this manner, the recommendation module 42 may monitor one or more physical space parameters 24 that may serve as performance metrics (e.g. Sales, Number of customers, etc.) for changes, and determine an updated recommendation 44 based on the change in the one or more performance metrics.

In another example, the authorized user may make a change to the physical space 30 that had not been recommended by the server 12. In this example, the authorized user may indicate, via the user interface 18 of the network portal 16, which physical space parameter 24 has been changed. Similarly to the process described above, the server 12 may be configured to compare measured values 22 before the change to the physical space 30 to measured values 22 after the change to the physical space 30. Changes or detected trends in the measured values 22 of one or more physical space parameters 24 may be collected and presented to the authorized user of the location account 28 for that physical space 30 via the user interface 18 of the network portal 16. In this manner, the authorized user may make a specific change to their physical space 30, and be presented with data regarding how that specific change has affected one or more physical space parameters 24, particularly physical space parameters that may be used as performance metrics, such as, for example, a Point of Sale physical space parameter, a Density of Persons physical space parameter, etc. In this manner, the authorized can perform various types of modeling and testing on the physical space 30, such as AB testing, etc. Utilizing the system 10 describe above, users of various physical spaces that are not otherwise linked by economic or data sharing relationships, may selectively exchange information with each other according to the structured data schemas and sharing permissions described herein. Further, the system 10 may be configured to programmatically generate recommendations and insights to each location based upon data accessible to that location through the system 10.

Figure 6:
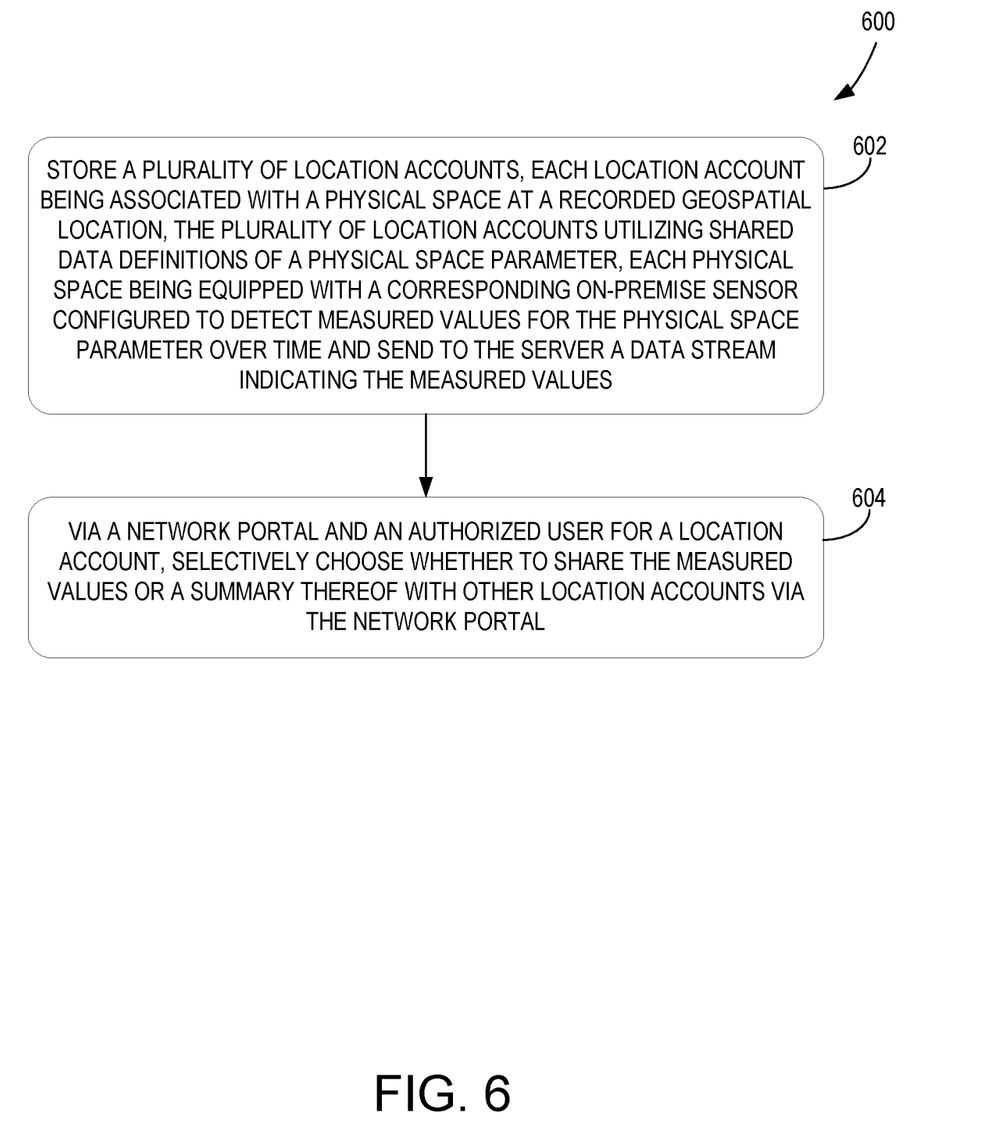
FIG. 6 shows a flowchart illustrating a method for sharing measured values of physical space parameters implemented by the computer system of FIG. 1.

FIG. 6 is a flow chart of a method implemented by a computer system. Method 600 may be executed using the systems described above or utilizing other suitable hardware and software elements.

At 602, the method may include, at a server including a processor, storing a plurality of location accounts. Each location account may be associated with a physical space at a recorded geospatial location. In the example illustrated in FIG. 1, the server 12 stores location accounts associated with the physical spaces 30 including the illustrated Bakery, Tap House, Coffee Shop A, Coffee Shop B, Gym, and Library. Each physical space 30 has a recorded geospatial location 32, which is where the building of the physical space 30 is located. In one example, the recorded geospatial location 30 may be a street address. In another example, the recorded geospatial location 30 may be a GPS location. In yet another example, the recorded geospatial location 30 may be a map location on a two or three-dimensional map of an area. The plurality of location accounts may utilize shared data definitions of a physical space parameter. In one example, the one or more physical space parameters 24 may include temperature, lighting, music, density of persons, customer demographics, point of sale data, store hours, day of year, time of day, product types, display types, and store layout. Each physical space may be equipped with a corresponding on-premise sensor configured to detect measured values for the physical space parameter over time and send to the server a data stream indicating the measured values.

The method at 604 may include, via a network portal and an authorized user for a location account, selectively choosing whether to share the measured values or a summary thereof with other location accounts via the network portal. In the example illustrated in FIGS. 1 and 2, an authorized user for the Coffee Shop A physical space may want to selectively share the measured values 22 from the on-premise sensors 46 with only physical spaces 30 that are not rival Coffee Shops. In another example, the authorized user may want to share the measured values 22 with the rival Coffee Shop B only if they reciprocate. In these examples, the authorized user may select appropriate sharing settings via the user interface 18 of the network portal 16 via user input 20 entered to an input device of the client computing device 14.

The server may be configured to determine a recommendation for a first location account based at least on measured values of the physical space parameter shared by a second location account and present the recommendation to a user of the first location account via the network portal. In one example, the recommendation module 42 implemented by the server 12 may be configured to compare measured values 22 for multiple different physical space parameters 24 between two or more location accounts 28 to determine the recommendation 44. As one specific example, the recommendation module 42 may be configured to compare measured values for the Point of Sale physical parameter between location accounts 28 having the same space type 34, and provide a recommendation to a first location account with a lower number of sales based on compared differences between other measured values 22 of other physical space parameters 24 between that location account and a second location account with a higher number of sales.

As described above, each location account may be linkable to other location accounts via peer connections in the network portal. In one example, an authorized user for a location account may search and manually select other location accounts to establish a peer connection. In another example, the server may be configured to determine a similarity between a first physical space associated with a first location account and a second physical space associated with a second location account. The server may additionally be configured to suggest establishment of a peer connection to the first and second location accounts. In one example, the server 12 may be configured to determine the similarity between the first and second physical spaces based on a geospatial proximity. That is, if the first and second physical spaces are within a threshold geospatial distance of each other, the server 12 may be configured to suggest establishment of a peer connection between the first and second location accounts associated with the first and second physical spaces.

As also described above, each location account may have an associated sharing profile set by the authorized user for that location account. The sharing profile may define a sharing rule according to which the measured values of the physical space parameter may be shared via the network portal with other location accounts. Settings and configurations for the sharing rule may be adjusted by the authorized user for the location account 28 via the user interface 18 of the network portal 16.

In one example, the sharing rule may include one or more physical space parameters selected from a plurality of physical space parameters that are shared via the network portal with other location accounts, and one or more physical space parameters selected from the plurality of physical space parameters that are not shared. In example illustrated in FIG. 3, each category of measured values 22 gathered by the suite of on-premise sensors 46 of the Coffee Shop A physical space are shown. Using the share GUI element 18A of the user interface 18, the authorized user of the location account 28 associated with the Coffee Shop A physical space 30 may select one or more physical space parameters that may be shared via the network portal 16 and one or more physical space parameters that may not be shared.

The sharing rule may include a sharing granularity at which the measured values of the physical space parameter are shared via the network portal with other location accounts. In one specific example, the user may select between a summary sharing granularity 54A and a full data sharing granularity 54B. The summary sharing granularity 54A may include sharing an average or range of measured values for the corresponding physical space parameter 24. On the other hand, the full data sharing granularity 54B may include sharing the full set of measured values 22 for the corresponding physical space parameter 24.

Each location account may include a space type associated with the physical space selected from a plurality of pre-defined space types. The sharing rule may include one or more of the plurality of pre-defined space types such that the measured values of the physical space parameter are not shared with location accounts associated with the one or more of the plurality of pre-defined space types. The plurality of pre-defined space types 36 define what type of physical space 30 is associated with a particular location account 28. In the example illustrated in FIG. 1, the plurality of pre-defined space types 36 may include a Bakery space type, a Tap House space type, a Coffee Shop space type, a Gym space type, and a Library space type. However, it will be appreciated that the plurality of pre-defined space types 36 may include other space types not shown in the illustrated example, such as a Farm space type, a Golf Course space type, a Track and Field space type, or any other suitable space type.

As further described above, the server may be configured to manage a permission level for each location account, and selectively grant access to measured values of the physical space parameter shared by other location accounts based on the permission level of that location account. In one example, the server 12 may be configured to share a finer granularity of measured values 22 the higher the permission level 56 granted to a location account 28. As another example, the server 12 may be configured to only share measured values 22 of physical space parameters 24 for which that location account is also sharing, in a reciprocal manner. In another example, the server may be configured to promote and demote the permission level of a location account based on the measured values of the physical space parameter shared by that location account.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
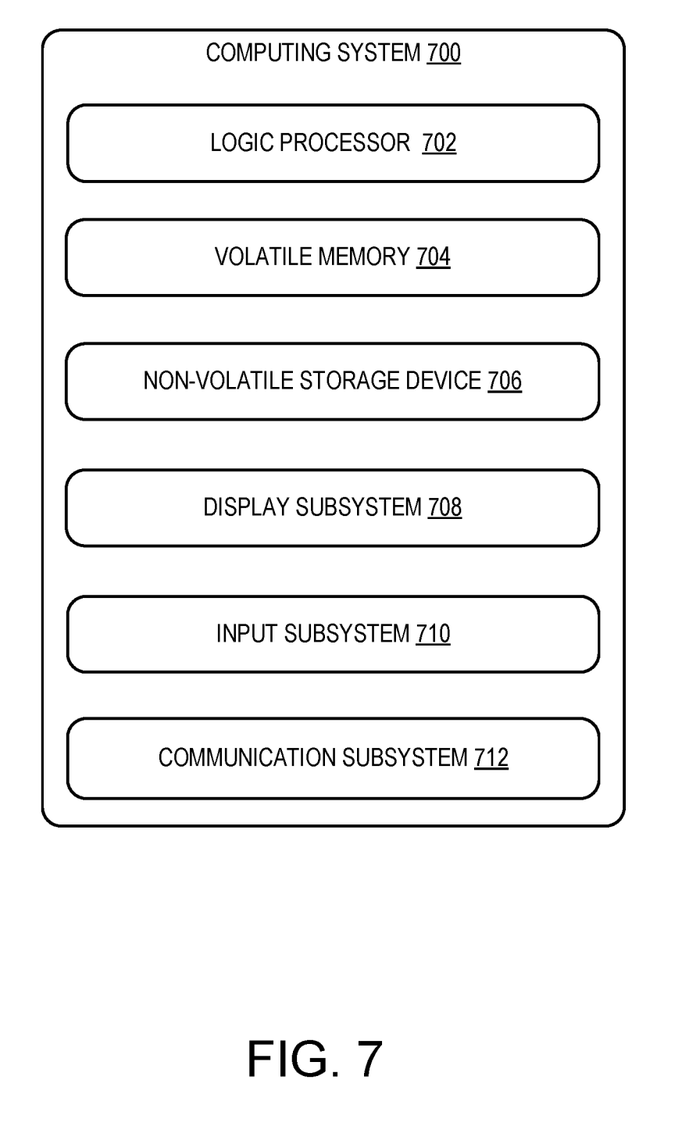
FIG. 7 is a schematic view of an example computing environment in which the computer system of FIG. 1 may be enacted.

FIG. 7 schematically shows a non-limiting embodiment of a computing system 700 that can enact one or more of the methods and processes described above. Computing system 700 is shown in simplified form. Computing system 700 may embody the computer system 10 described above, including the server 12, the client computing devices 14, and a computer device implementing the network portal 16, illustrated in FIG. 1. Computing system 700 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 700 includes a logic processor 702 volatile memory 704, and a non-volatile storage device 706. Computing system 700 may optionally include a display subsystem 708, input subsystem 710, communication subsystem 712, and/or other components not shown in FIG. 7.

Logic processor 702 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 702 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 706 includes one or more physical devices configured to hold instructions executable by the logic processors to implement the methods and processes described herein. When such methods and processes are implemented, the state of non-volatile storage device 704 may be transformed—e.g., to hold different data.

Non-volatile storage device 706 may include physical devices that are removable and/or built-in. Non-volatile storage device 704 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 706 may include nonvolatile, dynamic, static, read/write, read-only, sequential-access, location-addressable, file-addressable, and/or content-addressable devices. It will be appreciated that non-volatile storage device 706 is configured to hold instructions even when power is cut to the non-volatile storage device 706.

Volatile memory 704 may include physical devices that include random access memory. Volatile memory 704 is typically utilized by logic processor 702 to temporarily store information during processing of software instructions. It will be appreciated that volatile memory 704 typically does not continue to store instructions when power is cut to the volatile memory 704.

Aspects of logic processor 702, volatile memory 704, and non-volatile storage device 706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 typically implemented in software by a processor to perform a particular function using portions of volatile memory, which function involves transformative processing that specially configures the processor to perform the function. Thus, a module, program, or engine may be instantiated via logic processor 702 executing instructions held by non-volatile storage device 706, using portions of volatile memory 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 708 may be used to present a visual representation of data held by non-volatile storage device 706. The visual representation may take the form of a graphical user interface (GUI). As the herein described methods and processes change the data held by the non-volatile storage device, and thus transform the state of the non-volatile storage device, the state of display subsystem 708 may likewise be transformed to visually represent changes in the underlying data. Display subsystem 708 may include one or more display devices utilizing virtually any type of technology. Such display devices may be combined with logic processor 702, volatile memory 704, and/or non-volatile storage device 706 in a shared enclosure, or such display devices may be peripheral display devices.

When included, input subsystem 710 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 712 may be configured to communicatively couple various computing devices described herein with each other, and with other devices. Communication subsystem 712 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 700 to send and/or receive messages to and/or from other devices via a network such as the Internet.

The following paragraphs provide additional support for the claims of the subject application. One aspect provides a computer system, comprising a server configured to store a plurality of location accounts, each location account being associated with a physical space at a recorded geospatial location, the plurality of location accounts utilizing shared data definitions of a physical space parameter, each physical space being equipped with a corresponding on-premise sensor configured to detect measured values for the physical space parameter over time and send to the server a data stream indicating the measured values, and a network portal, via which an authorized user for a location account can selectively choose whether to share the measured values or a summary thereof with other location accounts via the network portal, wherein the server is configured to determine a recommendation for a first location account based at least on measured values of the physical space parameter shared by a second location account, and present the recommendation to a user of the first location account via the network portal. In this aspect, additionally or alternatively, the physical space parameter may be selected from the group consisting of temperature, lighting, music, density of persons, customer demographics, point of sale data, store hours, day of year, time of day, product types, display types, store layout, atmospheric gas composition, wavelengths of ambient light, vibration, customer interactions with objects, and employee interactions with customers. In this aspect, additionally or alternatively, each location account may be linkable to other location accounts via peer connections in the network portal. In this aspect, additionally or alternatively, the server may be configured to determine a similarity between a first physical space associated with a first location account and a second physical space associated with a second location account, and suggest establishment of a peer connection to the first and second location accounts. In this aspect, additionally or alternatively, each location account may have an associated sharing profile set by the authorized user for that location account, the sharing profile defining a sharing rule according to which the measured values of the physical space parameter are shared via the network portal with other location accounts. In this aspect, additionally or alternatively, the sharing rule may include one or more physical space parameters selected from a plurality of physical space parameters that are shared via the network portal with other location accounts, and one or more physical space parameters selected from the plurality of physical space parameters that are not shared. In this aspect, additionally or alternatively, the sharing rule may include a sharing granularity at which the measured values of the physical space parameter are shared via the network portal with other location accounts. In this aspect, additionally or alternatively, each location account may include a space type associated with the physical space selected from a plurality of pre-defined space types, and wherein the sharing rule may include one or more of the plurality of pre-defined space types such that the measured values of the physical space parameter are not shared with location accounts associated with the one or more of the plurality of pre-defined space types. In this aspect, additionally or alternatively, the server may be configured to manage a permission level for each location account, and selectively grant access to measured values of the physical space parameter shared by other location accounts based on the permission level of that location account. In this aspect, additionally or alternatively, the server may be configured to promote and demote the permission level of a location account based on the measured values of the physical space parameter shared by that location account.

Another aspect provides a method for use with a computing device, comprising, at a server including a processor, storing a plurality of location accounts, each location account being associated with a physical space at a recorded geospatial location, the plurality of location accounts utilizing shared data definitions of a physical space parameter, each physical space being equipped with a corresponding on-premise sensor configured to detect measured values for the physical space parameter over time and send to the server a data stream indicating the measured values, via a network portal and an authorized user for a location account, selectively choosing whether to share the measured values or a summary thereof with other location accounts via the network portal, and, at the server, determining a recommendation for a first location account based at least on measured values of the physical space parameter shared by a second location account, and presenting the recommendation to a user of the first location account via the network portal. In this aspect, additionally or alternatively, each location account may be linkable to other location accounts via peer connections in the network portal. In this aspect, additionally or alternatively, the method may further comprise, at the server, determining a similarity between a first physical space associated with a first location account and a second physical space associated with a second location account, and suggesting establishment of a peer connection to the first and second location accounts. In this aspect, additionally or alternatively, each location account may have an associated sharing profile set by the authorized user for that location account, the sharing profile defining a sharing rule according to which the measured values of the physical space parameter are shared via the network portal with other location accounts. In this aspect, additionally or alternatively, the sharing rule may include one or more physical space parameters selected from a plurality of physical space parameters that are shared via the network portal with other location accounts, and one or more physical space parameters selected from the plurality of physical space parameters that are not shared. In this aspect, additionally or alternatively, the sharing rule may include a sharing granularity at which the measured values of the physical space parameter are shared via the network portal with other location accounts. In this aspect, additionally or alternatively, each location account may include a space type associated with the physical space selected from a plurality of pre-defined space types, and wherein the sharing rule may include one or more of the plurality of pre-defined space types such that the measured values of the physical space parameter are not shared with location accounts associated with the one or more of the plurality of pre-defined space types. In this aspect, additionally or alternatively, the method may further comprise, at the server, managing a permission level for each location account, and selectively granting access to measured values of the physical space parameter shared by other location accounts based on the permission level of that location account. In this aspect, additionally or alternatively, the method may further comprise, at the server, promoting and demoting the permission level of a location account based on the measured values of the physical space parameter shared by that location account.

Another aspect provides a method for use with a computing device, comprising, at a server including a processor, storing a plurality of location accounts, each location account being associated with a physical space at a recorded geospatial location, the plurality of location accounts utilizing shared data definitions of a physical space parameter, each physical space being equipped with a corresponding on-premise sensor configured to detect measured values for the physical space parameter over time and send to the server a data stream indicating the measured values, and via a network portal and an authorized user for a location account, selectively choosing whether to share the measured values or a summary thereof with other location accounts via the network portal, wherein each location account is linkable to other location accounts via peer connections in the network portal, each location account has an associated sharing profile set by the authorized user for that location account, the sharing profile defining a sharing rule according to which the measured values of the physical space parameter are shared via the network portal with other location accounts, and, at the server, managing a permission level for each location account, and selectively granting access to measured values of the physical space parameter shared by other location accounts based on the permission level of that location account.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer system, comprising:
   a server configured to store a plurality of location accounts, each location account being associated with a physical space at a recorded geospatial location, the plurality of location accounts utilizing shared data definitions of a physical space parameter, each physical space being equipped with a corresponding on-premise sensor configured to detect measured values for the physical space parameter over time and send to the server a data stream indicating the measured values; and
   a network portal, via which an authorized user for a location account can selectively choose whether to share the measured values or a summary thereof with other location accounts via the network portal;
   wherein the server is configured to determine a recommendation for a first location account based at least on measured values of the physical space parameter shared by a second location account, and present the recommendation to a user of the first location account via the network portal; and
   wherein each location account has an associated sharing profile set by the authorized user for that location account, the sharing profile defining a sharing rule according to which the measured values of the physical space parameter are shared via the network portal with other location accounts, the sharing rule including one or more physical space parameters selected from a plurality of physical space parameters that are shared via the network portal with other location accounts, and one or more physical space parameters selected from the plurality of physical space parameters that are not shared.

2. The computer system of claim 1, wherein the physical space parameter is selected from the group consisting of temperature, lighting, music, density of persons, customer demographics, point of sale data, store hours, day of year, time of day, product types, display types, store layout, atmospheric gas composition, wavelengths of ambient light, vibration, customer interactions with objects, and employee interactions with customers.

3. The computer system of claim 1, wherein each location account is linkable to other location accounts via peer connections in the network portal.

4. The computer system of claim 3, wherein the server is configured to determine a similarity between a first physical space associated with a first location account and a second physical space associated with a second location account, and suggest establishment of a peer connection to the first and second location accounts.

5. The computer system of claim 1, wherein the sharing rule includes a sharing granularity at which the measured values of the physical space parameter are shared via the network portal with other location accounts.

6. The computer system of claim 1, wherein each location account includes a space type associated with the physical space selected from a plurality of pre-defined space types, and wherein the sharing rule includes one or more of the plurality of pre-defined space types such that the measured values of the physical space parameter are not shared with location accounts associated with the one or more of the plurality of pre-defined space types.

7. The computer system of claim 1, wherein the server is configured to manage a permission level for each location account, and selectively grant access to measured values of the physical space parameter shared by other location accounts based on the permission level of that location account.

8. The computer system of claim 7, wherein the server is configured to promote and demote the permission level of a location account based on the measured values of the physical space parameter shared by that location account.

9. A method for use with a computing device, comprising:
   at a server including a processor:
      storing a plurality of location accounts, each location account being associated with a physical space at a recorded geospatial location, the plurality of location accounts utilizing shared data definitions of a physical space parameter, each physical space being equipped with a corresponding on-premise sensor configured to detect measured values for the physical space parameter over time and send to the server a data stream indicating the measured values;
      via a network portal and an authorized user for a location account, selectively choosing whether to share the measured values or a summary thereof with other location accounts via the network portal; and
      at the server, determining a recommendation for a first location account based at least on measured values of the physical space parameter shared by a second location account, and presenting the recommendation to a user of the first location account via the network portal; and
      wherein each location account has an associated sharing profile set by the authorized user for that location account, the sharing profile defining a sharing rule according to which the measured values of the physical space parameter are shared via the network portal with other location accounts, the sharing rule including one or more physical space parameters selected from a plurality of physical space parameters that are shared via the network portal with other location accounts, and one or more physical space parameters selected from the plurality of physical space parameters that are not shared.

10. The method of claim 9, wherein each location account is linkable to other location accounts via peer connections in the network portal.

11. The method of claim 10, further comprising, at the server, determining a similarity between a first physical space associated with a first location account and a second physical space associated with a second location account, and suggesting establishment of a peer connection to the first and second location accounts.

12. The method of claim 9, wherein the sharing rule includes a sharing granularity at which the measured values of the physical space parameter are shared via the network portal with other location accounts.

13. The method of claim 9, wherein each location account includes a space type associated with the physical space selected from a plurality of pre-defined space types, and wherein the sharing rule includes one or more of the plurality of pre-defined space types such that the measured values of the physical space parameter are not shared with location accounts associated with the one or more of the plurality of pre-defined space types.

14. The method of claim 9, further comprising, at the server, managing a permission level for each location account, and selectively granting access to measured values of the physical space parameter shared by other location accounts based on the permission level of that location account.

15. The method of claim 14, further comprising, at the server, promoting and demoting the permission level of a location account based on the measured values of the physical space parameter shared by that location account.

16. A method for use with a computing device, comprising:
at a server including a processor:
storing a plurality of location accounts, each location account being associated with a physical space at a recorded geospatial location, the plurality of location accounts utilizing shared data definitions of a physical space parameter, each physical space being equipped with a corresponding on-premise sensor configured to detect measured values for the physical space parameter over time and send to the server a data stream indicating the measured values; and
via a network portal and an authorized user for a location account, selectively choosing whether to share the measured values or a summary thereof with other location accounts via the network portal, wherein
each location account is linkable to other location accounts via peer connections in the network portal;
each location account has an associated sharing profile set by the authorized user for that location account, the sharing profile defining a sharing rule according to which the measured values of the physical space parameter are shared via the network portal with other location accounts, the sharing rule including one or more physical space parameters selected from a plurality of physical space parameters that are shared via the network portal with other location accounts, and one or more physical space parameters selected from the plurality of physical space parameters that are not shared; and
at the server, managing a permission level for each location account, and selectively granting access to measured values of the physical space parameter shared by other location accounts based on the permission level of that location account.

17. The method of claim 16, further comprising, at the server, promoting and demoting the permission level of a location account based on the measured values of the physical space parameter shared by that location account.

18. The method of claim 16, wherein the sharing rule includes a sharing granularity at which the measured values of the physical space parameter are shared via the network portal with other location accounts.

19. The method of claim 16, wherein each location account includes a space type associated with the physical space selected from a plurality of pre-defined space types, and wherein the sharing rule includes one or more of the plurality of pre-defined space types such that the measured values of the physical space parameter are not shared with location accounts associated with the one or more of the plurality of pre-defined space types.

20. The method of claim 16, further comprising, at the server, determining a similarity between a first physical space associated with a first location account and a second physical space associated with a second location account, and suggesting establishment of a peer connection to the first and second location accounts.

* * * * *

UNITED STATES PATENT AND TRADEMARK OFFICE
CERTIFICATE OF CORRECTION

| | | |
|---|---|---|
| PATENT NO. | : 11,093,563 B2 | Page 1 of 1 |
| APPLICATION NO. | : 15/889099 | |
| DATED | : August 17, 2021 | |
| INVENTOR(S) | : Long et al. | |

It is certified that error appears in the above-identified patent and that said Letters Patent is hereby corrected as shown below:

In the Claims

In Claim 9, Column 20 Line 37 through Line 38, delete "via a network portal and an authorized user for a location account, selectively choosing whether to" and insert --via a network portal, receiving user input from an authorized user for a location account, the user input including a selection of whether to--.

In Claim 9, Column 20 Line 41, delete "at the server,".

In Claim 16, Column 21 Line 35 through Line 36, delete "via a network portal and an authorized user for a location account, selectively choosing whether to" and insert --via a network portal, receiving user input from an authorized user for a location account, the user input including a selection of whether to--.

In Claim 16, Column 22 Line 13, delete "at the server,".

Signed and Sealed this
Second Day of November, 2021

Drew Hirshfeld
*Performing the Functions and Duties of the
Under Secretary of Commerce for Intellectual Property and
Director of the United States Patent and Trademark Office*